US007121004B1

(12) United States Patent
Shoup

(10) Patent No.: US 7,121,004 B1
(45) Date of Patent: Oct. 17, 2006

(54) METHOD OF FABRICATING SECURITY DOOR

(75) Inventor: Curtis C. Shoup, Gardena, CA (US)

(73) Assignee: Columbia Manufacturing Corp., Gardena, CA (US)

( * ) Notice: Subject to any disclaimer, the term of this patent is extended or adjusted under 35 U.S.C. 154(b) by 761 days.

(21) Appl. No.: 09/325,311

(22) Filed: Jun. 3, 1999

Related U.S. Application Data

(62) Division of application No. 08/976,763, filed on Nov. 24, 1997, now Pat. No. 5,979,137.

(51) Int. Cl.
*B23P 15/00* (2006.01)

(52) U.S. Cl. .................. 29/897.312; 29/430; 29/432.2; 29/525.13; 52/656.8; 52/656.4; 49/50; 49/501

(58) Field of Classification Search ..................... None
See application file for complete search history.

(56) References Cited

U.S. PATENT DOCUMENTS 2,197,982 A * 4/1940 O'Brien .................... 29/897.15
2,274,125 A * 2/1942 Carney .................. 298/897.15
2,568,148 A * 9/1951 Goldsmith ............... 29/897.15
3,224,081 A * 12/1965 Richter ..................... 29/897.15
3,270,404 A * 9/1966 Andreassen .............. 29/897.15
3,720,995 A * 3/1973 Brown et al. ............ 228/173.6
3,738,678 A * 6/1973 King et al. ................ 52/656.8
3,892,939 A * 7/1975 Medley .................... 29/897.15
4,395,861 A * 8/1983 Fipke et al. ............... 52/656.8
4,470,717 A * 9/1984 Bruknke et al. ......... 228/173.6
4,575,965 A * 3/1986 Iversen .......................... 49/50
4,630,396 A * 12/1986 Zvi et al. ........................ 49/55
4,653,226 A * 3/1987 Woodrow ....................... 49/50
5,018,263 A * 5/1991 Stern .......................... 29/469.5
5,428,924 A * 7/1995 Pifer ............................. 49/50
5,429,410 A * 7/1995 Fleischer ...................... 49/502
5,549,352 A * 8/1996 Janotik et al. ............. 52/653.2
5,862,645 A * 1/1999 Lee ............................. 49/401

* cited by examiner

*Primary Examiner*—T. Nguyen
(74) *Attorney, Agent, or Firm*—Charles H. Thomas

(57) ABSTRACT

A security door for a gate or building opening is formed of a metal frame that defines a pair of hollow stile frame members and upper and lower hollow transverse rail frame members. Each of the frame members has an inner face with an attachment flange projecting therefrom. Security receiving apertures are defined in the inner faces of the frame members. In the fabrication of the door a plurality of metal security bars are positioned relative to the hollow frame member so that the ends of the security bars project through the security bar receiving apertures and into the hollow frame members. The security bars pass over and reside in contact with the attachment flanges. The security bars are spot welded to the attachment flanges so as to permanently secure them to the door frame. Also, the frame itself is preferably formed from a single, elongated strip of metal that is roll formed and then bent at mitered corner cuts to create and delineate the stile and rail members. Corner fastening tabs are preferably formed on at least some of these members so as to reside in contact with the ends of other of the frame members located immediately adjacent thereto. The fastening tabs are secured by spot welding to the adjacent members which they contact.

16 Claims, 4 Drawing Sheets

METHOD OF FABRICATING SECURITY DOOR

The present application is a division of U.S. patent application Ser. No. 08/976,763 filed Nov. 24, 1997, now U.S. Pat. No. 5,979,137.

BACKGROUND OF THE INVENTION

1. Field of the Invention

The present invention relates to a security door and a method of manufacturing a security door.

2. Description of the Prior Art

With the rise of anxiety concerning both personal safety and the security of property, the use of security doors has become increasingly commonplace. Conventional security doors are formed of rectangular frames of heavy metal tubing, often drawn and rolled steel having a thickness of about 0.090 inches. The steel tubing is formed to create upright stile members and upper and lower transverse rail members extending between the stile members. To create security, a grid of metal bars is provided across the rectangular opening defined between the stile and rail members. Some of these metal bars extend parallel to the stiles and are anchored to the transverse rail members at the top and bottom of the door. Other metal security bars are oriented perpendicular to the door stiles and are secured thereto.

In some cases additional decorative and angular metal bars are provided as an adjunct to the rectilinear grid that functions to provide the door with a high level of security. Quite often a security door is also provided with a screen mesh to exclude invasion. Security doors are mounted in gate openings or in buildings in surrounding metal frames that are firmly secured in the doorway to be protected.

The conventional fabrication of security doors is both expensive and time consuming. Specifically, the metal security bars forming the rectilinear grillwork are at present secured to the elements or segments of the surrounding rectangular frame forming the door by means of arc welding. The process of arc welding is expensive and time consuming. Furthermore, arc welding requires a considerable amount of skill to create a sound weld. Therefore, it is necessary to employ factory workers with a high level of welding skill and experience in order to create the arc welds necessary in the fabrication of security doors. As an alternative to manual welding, robotic welding machines can be used. However, such robotic welding machines require major capital investments and drastically increase the overhead expenses necessary for security door fabrication.

SUMMARY OF THE INVENTION

A primary object of the present invention is to provide a system for fabricating security doors which avoids the need for the skill and/or expense involved in attaching security bars into a surrounding frame of a security door by arc welding, but which produces a security door having the strength and rigidity previously obtained only through the use of arc welding. According to the present invention the structural strength and rigidity necessary for a security door is achieved by forming the metal frame of the door with hollow segments in which security bar receiving apertures have been defined, and attaching the bars of the security door to the surrounding frame with spot welds. The structure of the door is such that portions of the frame reside in a face-to-face disposition with surfaces of the bars. Such a face-to-face relationship between metal surfaces is necessary in order for the process of spot welding to be effective.

Unlike the process of arc welding, spot welding does not require the use of a high temperature torch nor the use of any flux which must be melted at the same time that the metal parts to be joined are at just the right temperature to achieve a secure weld. In the process of spot welding a pair of copper welding tips or electrodes are brought from opposite sides into contact with mutually facing metal parts to be joined together. A brief, high amperage electrical current is then passed through the electrodes and through the juxtaposed metal parts sandwiched therebetween. The metal surfaces melt together in a small area through which the electric current passes at the interface between the metal parts to be joined. The resulting spot weld is extremely strong, since it is created by an actual melting together of the metal surfaces to be joined. Nevertheless, operation of a spot welding machine requires no particular skill.

Another object of the invention is to create a security door frame in which the corners of the intersecting members forming the frame are rigidly joined together. In conventional practice the stiles and rails of security doors are typically formed of drawn and rolled steel configured into a tube that is seam welded utilizing an arc welding process. While the tubing forming the stiles and rails is originally formed in a circular shape, through processing the tubing is reshaped to a square or rectangular, cross-sectional configuration. The sections of the tubing forming the stiles and rails are then arc welded at their ends to form a door frame having a rectangular perimeter. The steel bars are then secured to the stiles and rails by an arc welding process.

By utilizing a spot welding process according to the present invention in the fabrication of a security door, it is possible to from the stiles and rails of the door frame from sheet metal using a roll-forming process. This allows a thinner gage of steel to be used in the construction of the stiles and rails, but the door frame is even stronger than conventional security door frames because stiffening ribs or flanges can be roll-formed into the sheet metal. As a consequence, even thought the frame members forming the door frame of the present invention are lighter in weight than conventional door frame members of the same size, the door frame members of the present invention have a stronger bending moment than their conventional counterparts.

It would not be possible to fasten the bars of a security door to roll-formed sheet metal stile and rail members using conventional methods of security door fabrication, since any attempt to arc weld the bars to the sheet metal frame members would cause holes to be burnt through the sheet metal stock of the frame members. However, by utilizing the technique of spot welding rather than arc welding it is possible to secure security bars to roll-formed sheet metal stile and rail members to form a security door that is lighter in weight, stronger, and cheaper to manufacture than conventional security doors.

In one broad aspect the invention may be considered to be an improvement in a method of fabricating a metal security door having a frame formed with a pair of hollow, upright stile members, upper and lower hollow transverse rail members extending between the stile members, and security bars extending between at least some of the stile and rail members. The improvement of the invention resides in the step of spot welding the security bars to at least some of the stile and rail members.

Preferably, the hollow stile and rail frame segment members are roll-formed from a single elongated sheet of steel. A security bar attachment flange is roll-formed on each of the hollow stile and rail segment members. The security bar attachment flanges are formed by rolling the opposing longitudinal edges of the sheet metal strip together and turning one edge over the other. The attachment flanges project inwardly within the rectangle formed by the stile and rail members and the in a common plane.

Security bar receiving openings are preferably defined in each of the perimeter stile and rail segment members so as to reside proximate to the security bar attachment flanges thereof on one side of a common plane. The security bar receiving openings in each adjacent stile and rail segment member lie on the opposite side of the same plane. As a consequence the security bars extending between and spot welded to the stiles and the security bars extending between and spot welded to the rails do not interfere with each other.

Preferably also, at least some of the perimeter segment stile and rail members are formed with pairs of corner tabs projecting from their ends. These corner tabs are formed by die cutting the single strip of sheet metal with longitudinally extending tabs at mitered corners between adjacent segment members. When the roll-formed sheet metal structure is bent at right angles between the perimeter segment stile and rail members, the corner securing tabs projecting from the segment members upon which they are formed are disposed in juxtaposition and in contact with the ends of the immediately adjacent segment members. The securing tabs are then spot welded to the opposing ends of the segment members located immediately adjacent thereto.

The pairs of corner securing tabs can either be formed as longitudinal extensions from both ends of the upper and lower rail members, longitudinal extensions from both ends of the stile members, or longitudinal extensions from one end of each of the members. The corner securing tabs are arranged in pairs so as to stiffen both the interior and exterior faces of the door frame.

In another aspect the present invention may be considered to be a method of fabricating a metal security door. The steps of the method of the invention comprise: forming four hollow door perimeter segment members so as to define a plurality of security bar receiving openings in each of the perimeter segment members; positioning a plurality of metal security bars to project through security bar receiving openings and into the hollow perimeter segment members so that the ends of the metal security bars terminate within the perimeter segment members and the perimeter segment members together form a rectangle; and spot welding the ends of the metal security bars to the perimeter segment members within which they terminate.

In another broad aspect the invention may be considered to be a security door comprising: a mutually parallel pair of hollow, roll-formed sheet metal upright stiles having opposing extremities; mutually parallel, hollow, roll-formed sheet metal upper and lower transverse rails connected to the extremities of the upright stiles and oriented perpendicular thereto; security bars extending between and spot welded to the upright stiles; and security bars extending between and spot welded to the rails.

Preferably the stiles and rails are formed with security bar receiving apertures therein and bar attachment flanges thereon. The security bars preferably extend through the security bar receiving apertures into the stiles and rails. The security bars are spot welded to the stiles and rails at the attachment flanges. Corner securing tabs preferably extend from selected ones of the stiles and rails, and are spot welded to other of the stiles and rails.

The invention may be described with greater clarity and particularity by reference to the accompanying drawings.

DESCRIPTION OF THE EMBODIMENT AND IMPLEMENTATION OF THE METHOD

Figure 1:
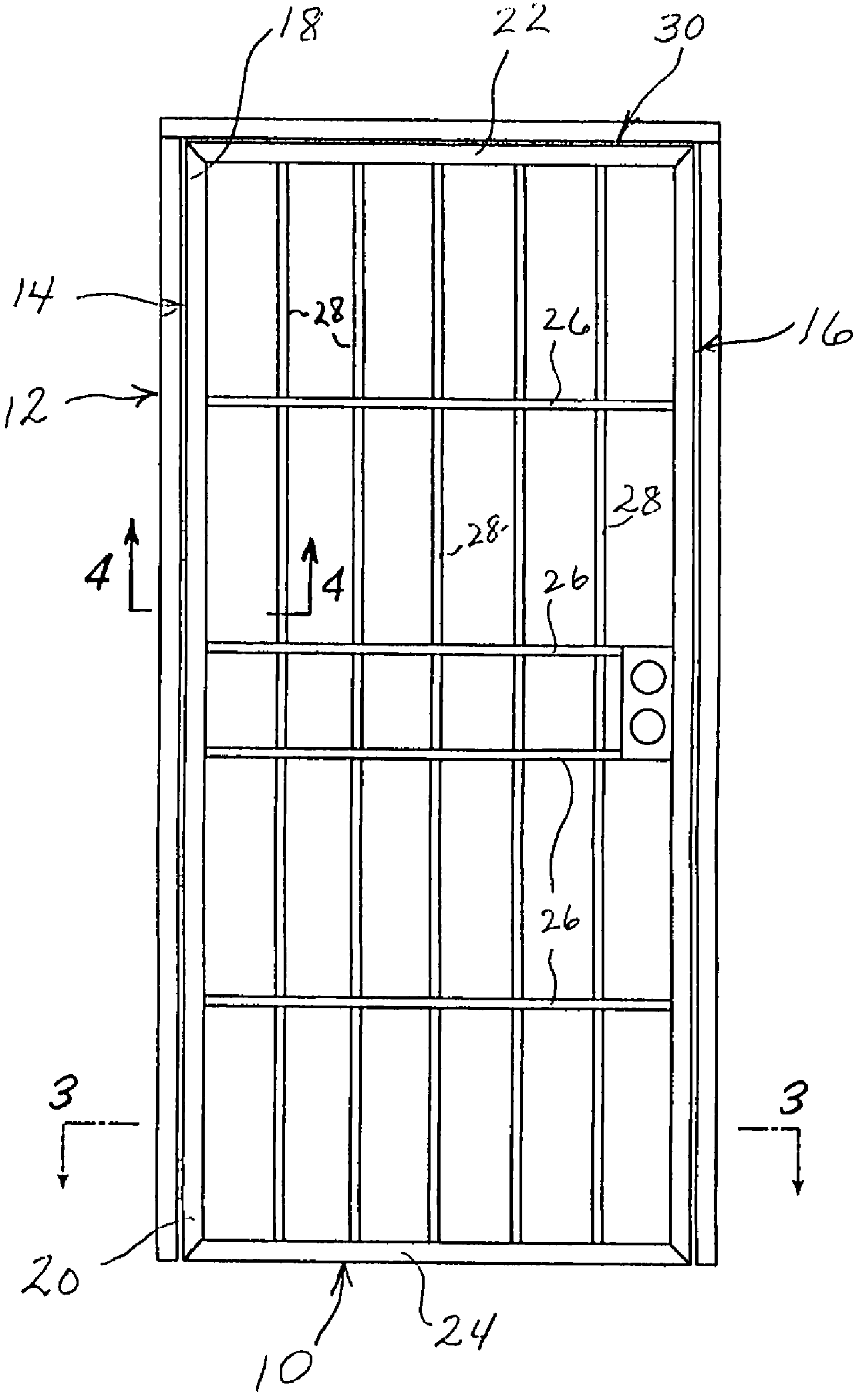
FIG. 1 is a front elevational view of a security door constructed according to the invention.

FIG. 1 illustrates a security door 10 fabricated according to the invention and mounted within a frame 12 in the manner in which the security door 10 is installed in a door opening in a building. The security door 10 is comprised of a mutually parallel pair of hollow, roll-formed sheet metal upright stiles 14 and 16 each having opposing extremities 18 and 20. The security door 10 also is formed with a hollow, roll-formed sheet metal upper transverse rail 22 and a corresponding lower transverse rail 24 of the same construction. The upper and lower rails 22 and 24 are collected to the extremities 18 and 20 of the upright stiles 14 and 16 and are oriented perpendicular thereto. Together the stiles 14 and 16 and the upper and lower rails 22 and 24 form a metal door perimeter frame 30. Steel security bars 26 one-half inch square extend between and are spot welded to the upright stiles 14 and 16. Other steel security bars 28 also one-half inch square extend between and are spot welded to the rails 22 and 24.

Figure 2:
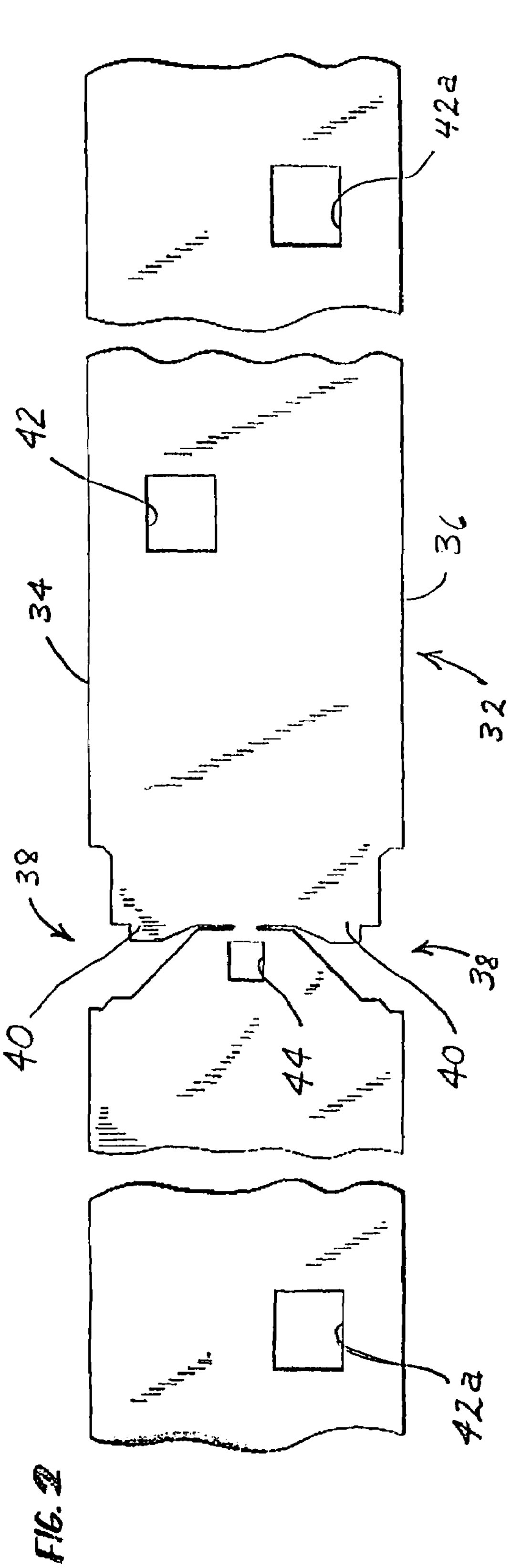
FIG. 2 is a plan detail of a section of the sheet metal strip utilized to form the door frame of FIG. 1.
Figure 3:
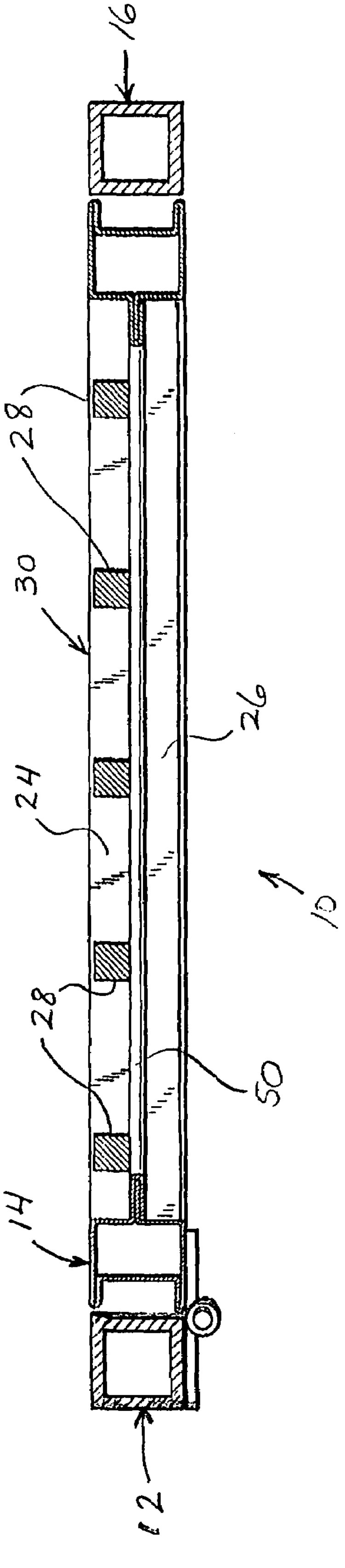
FIG. 3 is a transverse sectional view taken along the lines 3—3 of FIG. 1.

The door frame 30 preferably is fabricated from a single, elongated strip of sheet metal 32 which is initially flat, as depicted in FIG. 2. However, four individual lineals could just as easily be used in the construction if desired. The elongated metal strip 32 is preferably formed of sheet steel about 0.025 inches in thickness. The elongated sheet metal strip 32 that has opposing longitudinal edges 34 and 36 in which indentations 38 are die cut to form mitered corners where the stiles 14 and 16 meet the rails 22 and 24.

In the embodiment illustrated the die cut indentations 38 are configured to form a pair of corner securing tabs 40 at both ends of each of the transverse rail members 22 and 24. The corner securing tabs 40 project longitudinally toward the portions of the sheet metal strip 32 that form the ends 18 and 20 of the stiles 14 and 16.

Also, and while the sheet metal strip 32 is still in a flat condition, it is die cut to form security bar receiving apertures 42 for receiving the vertical bars 28 and 42*a* for receiving the horizontal bars 26 in the portions in the strip 32 that are ultimately respectively formed into the hollow rail and stile segments. Furthermore, while the elongated sheet metal strip 32 is still in a flat condition, it is initially die cut to form spot welding electrode access openings 44 in those portions of its structure that ultimately form the opposing ends 18 and 20 of each of the stile members 14 and 16. The initial die cutting of the sheet metal strip 32 ultimately creates a spot welding tip access aperture 44 in the hollow members forming the door frame 30 at each of the corners thereof.

Once the elongated metal strip 32 has been die cut with the indentations and openings as illustrated in FIG. 2, it is roll formed to create the hollow frame segment stile and rail members 14, 16, 22, and 24 substantially in the manner described in U.S. Pat. No. 5,018,263, which is incorporated herein by reference. That is, the sheet metal strip 32 is passed through a series of rollers that progressively shape the strip 32 into the hollow, generally rectangular, cross-sectional configuration depicted in FIG. 4. While FIG. 4 shows a cross-sectional view through only the stile 14, the cross-sectional configuration of both of the stiles 14 and 16 and the transverse upper and lower rails 22 and 24 is identical.

Figure 4:
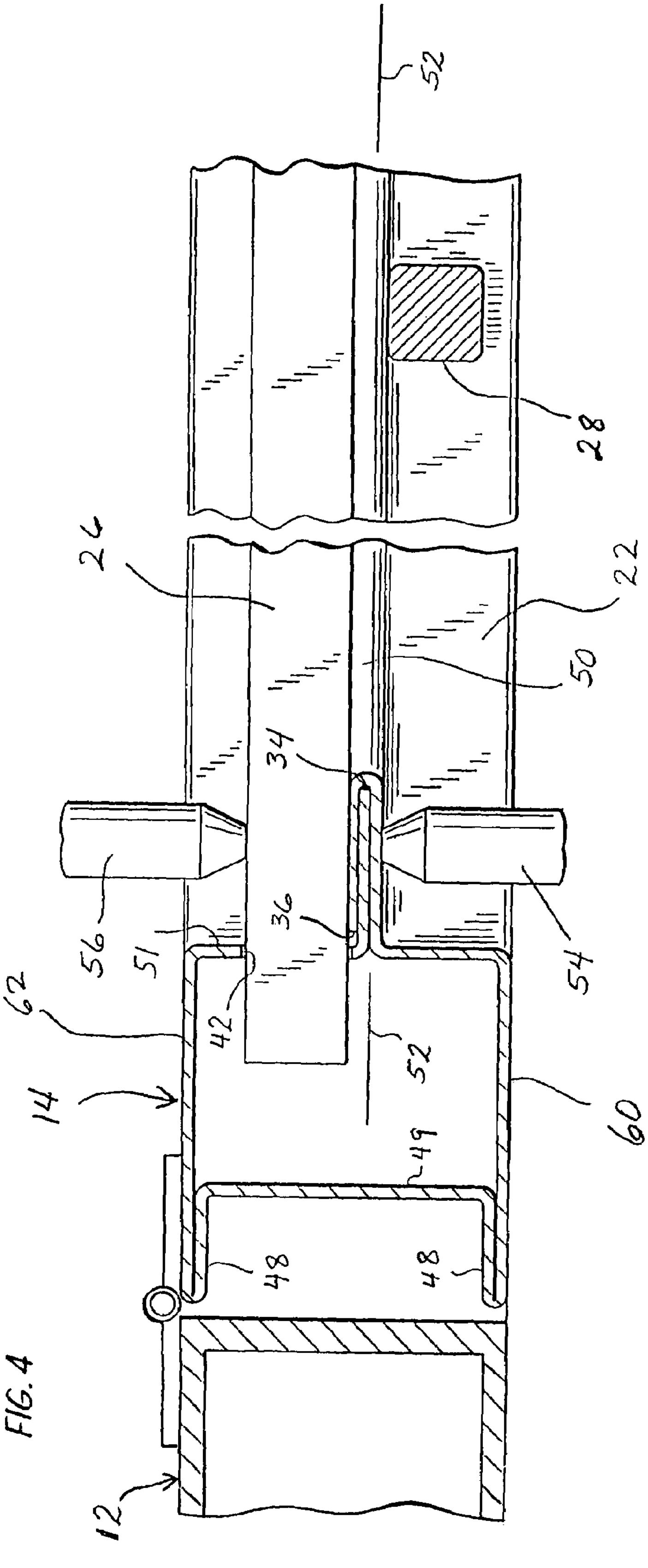
FIG. 4 is a sectional detail taken along the lines 4—4 of FIG. 1 showing the manner in which the security bars are spot welded to the frame of the security door of the invention.

As shown in FIG. 4, the hollow segment members forming the frame 30 are roll formed to define a pair of outwardly directed legs or ribs 48 created by bending the structure of the sheet metal strip 32 sharply back on itself. These legs 48 project outwardly from a web 49 formed therebetween and provide the stiles 14 and 16 and the rails 22 and 24 of the frame 30 with lateral strength that creates a stronger bending moment than is achieved in conventional security door frame construction. Even though the structural members of the frame 30 are formed of a thinner gage of metal than the drawn and rolled steel tubing used to form conventional security doors, which is typically about 0.90 inches, they are stronger than their conventional counterparts. Moreover, the use of a thinner gauge of metal reduces the cost of materials required in the fabrication of the security door 10 quite substantially. Furthermore, the cost of fabrication is greatly reduced since the sheet metal strip 32 is of a thickness that can be roll-formed. The expensive and time consuming process of seam welding is thus avoided.

In the roll-forming process the longitudinal edges 34 and 36 of the sheet metal strip 32 are progressively brought together such that the marginal region of the strip 32 proximate the edge 36 is wrapped over the edge 34. The edges 34 and 36 are thereby rolled together and the edge 36 is turned over the edge 34 to form security bar attachment flanges 50 on both of the stiles 14 and 16 and on both the upper rail 22 and the lower rail 24. The attachment flanges 50 all project inwardly from the inwardly facing surfaces 51 of the stiles 14 and 16 and the rails 22 and 24.

The inwardly directed attachment flanges 50 are all essentially flat and reside in a common plane 52 as is evident in FIG. 4. The security bar receiving openings 42*a* in the stiles 14 and 16 lie on one side of this common plane 52, while the security bar receiving openings 42*a* in the upper and lower rails 22 and 24 lie on the opposite side of the plane 52. All of the security bar receiving openings 42 and 42*a* lie immediately adjacent to the attachment flanges 50 on the frame segment members in which they are formed.

Once the sheet metal strip 32 has been roll formed to create the stiles 14 and 16 and the upper rail 22 and the lower rail 24, the structure of the frame is bent at its corners. For example, the stile 14 may first be bent upwardly at its lower end 20 as indicated in phantom at 14' in FIG. 5 to assume an orientation perpendicular to the lower rail 24. The lower ends of the security bars 28 are thereupon inserted into the security bar receiving openings 42 in the lower rail 24. The left-hand ends of the security bars 26, as viewed in FIG. 1, are inserted into the security bar receiving openings 42*a* in the stile 14.

The upper rail 22 is then bent over at its demarcation from the upper end 18 of the stile 14 formed by a pair miter cuts 38 to a perpendicular orientation relative to the stile 14. The stile 16 is likewise bent into a perpendicular orientation relative to the upper transverse rail 22, also at miter cuts 38 that delineate the stile 16 from the upper rail 22.

The security bars 28 are longer than the distance between the inwardly facing surfaces 51 of the upper and lower rails 22 and 24 but (do not extend all the way to the webs 49 formed between the pair of legs 48 of the rail members 22 and 24. Consequently, as the upper rail 22 is brought into position perpendicular to the stile 14, the security bars 28 can be temporarily advanced into the hollow confines of the lower rail 24 so as not to obstruct movement of the upper rail member 22 into its horizontal orientation perpendicular to the stile 16. Thereafter, the security bars 28 are moved back upwardly so that the upper ends thereof are inserted into the security bar receiving openings 42 in the interiorly facing surface 51 of the upper rail 22. The opposite ends of the vertical security bars 28 thereby project into the hollow enclosures formed within both the upper and lower rails 22 and 24.

Similarly, the horizontal, transverse security bars 26 are longer than the distance of separation between the surfaces 51 of the stiles 14 and 16 in which the security bar openings 42*a* are formed, but short enough so that they can be move in reciprocal fashion slightly to allow the stile 16 to be brought into position perpendicular to the transverse rails 22 and 24. The horizontal security bars 26 are thereupon moved slightly to the right as viewed in FIG. 1 so as to project through the security bar receiving openings 42*a* in both of the stiles 14 and 16 and into the hollow enclosures therewithin. As is evident in FIG. 4, the security bars 26 and 28 all pass closely adjacent to, and indeed reside in contact with, the attachment flanges 50 on opposite sides of the plane 52 from each other.

As also illustrated FIG. 4, copper spot welding electrodes or tips 54 and 56 are thereupon moved reciprocally toward each other and into respective contact with the attachment flange 50 of the stiles 14 and 16 and the ends of the transverse security bars 26 proximate their extremities. A high amperage electrical current is then passed between the electrodes 54 and 56 thereby creating a spot weld at the interface where the surfaces of the security bars 26 contact the attachment flanges 50 of the stiles 14 and 16. The security bars 26 thereby reside in contact with and are attached by spot welding to the flanges 50 of the stiles 14 and 16. The ends of the vertical security bars 28 are secured by spot welding to the attachment flanges 50 of the transverse rail members 22 and 24 in the same manner.

As illustrated, the security bars 28 that extend between and into the transverse rail members 22 and 24 are spot welded to the attachment flanges 50 thereof on the opposite side of the plane 52 from the security bars 26. The security bars 26 and 28 thereby reside in contact with and are spot welded to their respective attachment flanges 50 on opposite sides of the plane 52 and from each other.

Figure 5:
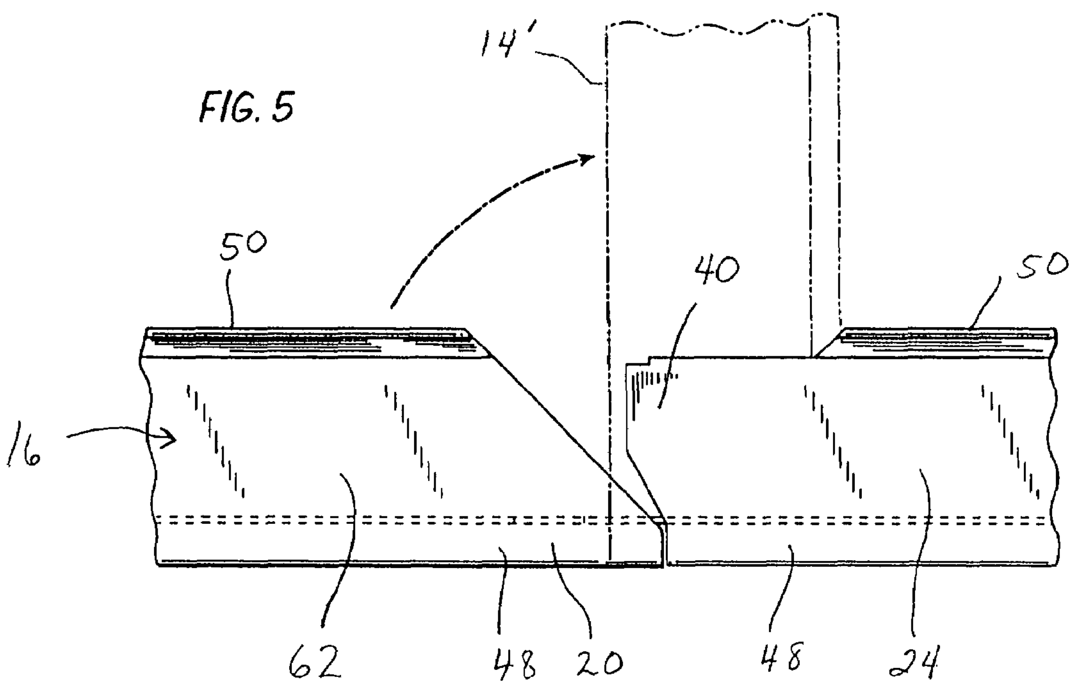
FIG. 5 is a elevational detail showing the transition between two of the hollow, roll-formed door frame segment members at an intermediate stage in the manufacture of the door frame of FIG. 1.
Figure 6:
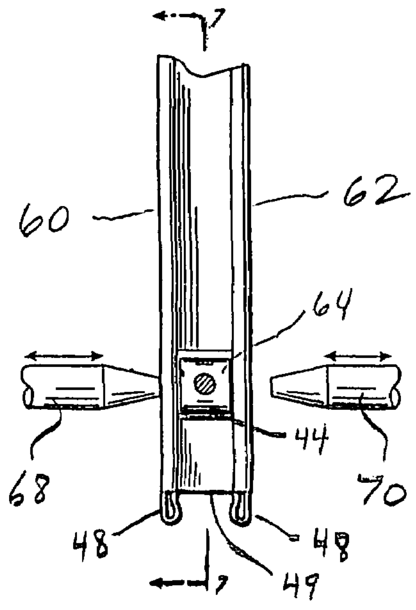
FIG. 6 is an edge view of the portions of the door frame segment member shown in FIG. 5 being spot welded together once they have been moved into their final assembly positions.
Figure 7:
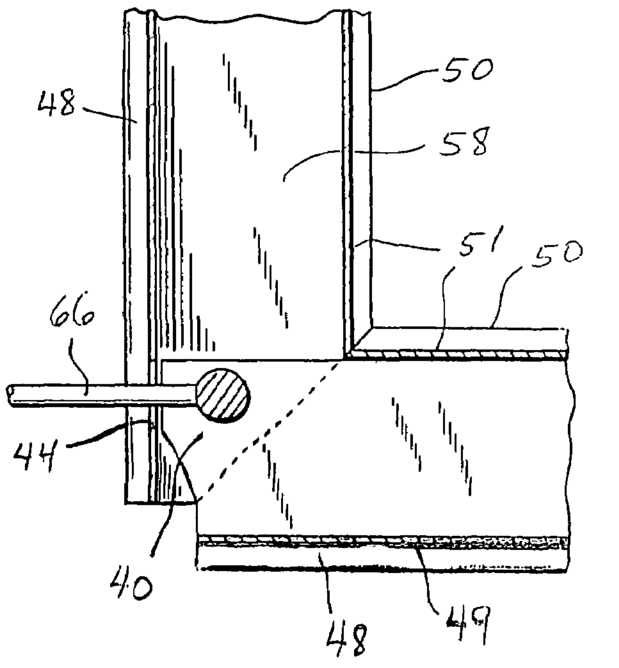
FIG. 7 is a sectional detail taken along the lines 7—7 of FIG. 6.

As illustrated in FIGS. 5, 6, and 7, the corner securing tabs 40 projecting from both ends of the rail members 22 and 24 overlap and reside in contact with the interior surfaces 58 of the inwardly and outwardly facing side walls 60 and 62 of the stiles 14 and 16. To rigidify the corners of the frame 30, the corner fastener tabs 40 are spot welded to the surfaces 58 of the side walls 60 and 62 of the stiles 14 and 16 with which they lie in contact. This is done by inserting internal spot welding electrodes 64 into the electrode access openings 44 defined in the webs 49 of the stiles 14 and 16.

The internal spot welding electrodes 64 are copper, disc-shaped structures mounted upon the ends of reciprocal electrode posts 66. In preparation for spot welding the corners of the door frame 30, the internal spot welding electrodes 64 are advanced laterally in a direction perpendicular to the orientation of the stiles 14 and 16 and parallel to the orientation of the rails 22 and 24 to the position depicted in FIGS. 6 and 7. Since all electrode access opening 44 is defined in each of the opposing ends 18 and 20 of each of the stiles 14 and 16, there is an electrode access opening 44 located at each corner of the rectangular door frame 30.

With the internal electrodes 64 in position as depicted in FIGS. 6 and 7, external electrodes 68 and 70 are simultaneously brought into contact with the side walls 60 and 62, respectively, of the stiles 14 and 16. The external electrodes 68 at each corner of the frame 30 are simultaneously brought into contact with the side walls 60 of the stile members 14 and 16 with the internal spot welding electrodes 64 in position at each of the four corners of the frame 30 as illustrated in FIG. 6. A high amperage electrical current is then passed between the electrodes 64 and 68, thereby spot welding one corner fastening tab 40 in each pair of fastening tabs to the stile side walls 60.

The external electrodes 68 are then withdrawn from contact with the side walls 60 of the stiles 14 and 16 and the external electrodes 70 are thereupon brought into contact with the side walls 62 thereof. An electrical current is again created and passed between the external electrodes 70 and internal electrodes 64, thereby welding the other of the corner fastening tabs 40 in each pair to the side walls 62 of the stile members 14 and 16. Following this step the internal electrodes 64 are withdrawn back through the electrode access openings 44. The fabrication process in the manufacture of the security door 10 is thereupon complete.

The present invention provides a unique system for creating a security door 10 of extremely sound construction far more quickly and economically than has heretofore been possible. Furthermore, the cost of materials is significantly reduced compared to the material costs incurred in the conventional manufacture of security doors.

A very important feature of the invention is that it is totally unnecessary to employ any arc welding step in the security door fabrication process. This reduces the labor costs or use of costly robotics in the manufacturing process significantly, and also reduces the incidence of bad or misplaced welds, which often occur in products produced by arc welding.

Undoubtedly, numerous variations and modifications of the invention will become readily apparent to those familiar with the structure and fabrication of security doors. For example, it is readily apparent that a security door produced according to the invention may be provided with conventional screen material to exclude insects but still permit ventilation. Also, while the corner fastening tabs 40 in the embodiment depicted are formed at the ends of the rail members 22 and 24, the miter cuts could be altered so that the corner fastening tabs project from both ends of the stiles 14 and 16 instead, or from a single end of each of the stile and rail members. Also, while in the embodiment illustrated all of the stile and rail members were formed from a single elongated strip of sheet metal, the different segments of the frame member could also be formed from separate strips of sheet metal, since the corners of the door frame where the stiles and rails meet are spot welded together.

Other modifications of the invention are also possible. Accordingly, the scope of the invention should not be construed as limited to the specific embodiment illustrated or manner of implementation of the method described.

I claim:

1. In a method of fabricating a metal security door having a frame formed with a pair of hollow, upright stile members, upper and lower transverse rail members extending between said stile members, and a plurality of transverse security bars extending between said stile members and a plurality of upright security bars extending between said rail members, the improvement comprising forming said stile members and said rail members with flat, inwardly directed attachment flanges, positioning said transverse security bars so that they pass across said attachment flanges of said stile members, and positioning said upright security bars so that they pass across said attachment flanges of said rail members wherein said upright and transverse security bars reside in contact with said attachment flanges across which they pass, and spot welding said security bars to said stile and rail members by spot welding them to said attachment flanges across which they pass.

2. A method according to claim 1 including a plurality of security bars extending between and into said stile members and a plurality of security bars extending between and into said rail members, and further comprising forming said stile members and said transverse rail members with flat, inwardly directed attachment flanges across which said security bars pass, wherein said security bars reside in contact with and are spot welded to said attachment flanges.

3. A method according to claim 1 further comprising first punching security bar receiving openings in at least one flat sheet metal strip and cutting said at least one flat sheet metal strip to form corner securing tabs thereon, roll forming said at least one flat sheet metal strip to form said hollow members at least some of which have pairs of said corner securing tabs projecting therefrom, positioning said hollow members so that said frame has a rectangular configuration forming four corners in which said transverse rail members meet said upright stile members with a pair of said corner securing tabs at each of said corners projecting into an adjacent hollow member, and spot welding said pairs of corner securing tabs to a hollow member adjacent thereto at each of said corners.

4. A method according to claim 3 further comprising forming all of said hollow members from a single flat, sheet metal strip.

5. A method according to claim 4 further comprising initially cutting spot welding tip access apertures in said flat, sheet metal strip, thereby creating at least one spot welding tip access aperture in said hollow members at each of said corners, and spot welding said pairs of corner securing tabs to said adjacent hollow members by inserting internal spot welding tips into said spot welding tip access apertures so as to contact said corner securing tabs within said adjacent hollow members, bringing external spot welding tips into external contact with said adjacent hollow members and passing electric currents between said internal and said external spot welding tips to spot weld said hollow members together at each of said corners.

6. A method of fabricating a metal security door comprising:

forming four hollow metal door perimeter segment members so as to define a plurality of security bar receiving openings in each of said perimeter segment members, positioning a plurality of metal security bars to project through said security bar receiving openings and into said perimeter segment members so that said ends of said metal security bars terminate within said perimeter segment members and positioning said perimeter segment members together to form a rectangle, and spot welding said ends of said metal security bars to said perimeter segment members within which they terminate.

7. A method according to claim 6 further comprising roll forming said segment members so as to create a security bar attachment flange on each of said hollow perimeter segment members, whereby when said perimeter segment members are positioned together to form said rectangle said attachment flanges all project inwardly within said rectangle and lie in a common plane, and whereby said security bar receiving openings in each of said perimeter segment members reside proximate to said security bar attachment flange thereof on one side of said common plane while said security bar receiving openings in each adjacent perimeter segment member lie on the opposite side of said common plane.

8. A method according to claim 7 further comprising forming said hollow segment members from at least one elongated sheet of metal having opposing longitudinal edges, rolling said edges together and turning one edge over the other to form said security bar attachment flanges.

9. A method according to claim 8 further comprising forming all of said hollow segment members from a single, elongated sheet of metal.

10. A method according to claim 6 further comprising forming at least some of said perimeter segment members with corner tabs projecting from their ends and spot welding said corner tabs to other of said perimeter segment members located adjacent thereto.

11. A method according to claim 10 further comprising cutting electrode access openings in at least some of said perimeter segment members so that there is an electrode access opening at each corner of said rectangle, inserting internal spot welding electrodes into said electrode access openings, pressing external spot welding electrodes against said perimeter segment members to hold said corner tabs in contact with said other of said perimeter segment members located adjacent thereto, and passing electric current between said internal and said external electrodes to spot weld said corner tabs to said other of said perimeter segment members located adjacent thereto at each of said corners of said rectangle.

12. A method of fabricating a security door comprising:

forming a metal door frame to define a pair of hollow upright stile frame members and upper and lower hollow transverse rail frame members so that each of said frame members has an inner face with an attachment flange projecting therefrom and forming security bar receiving apertures in all of said frame members so that said security bar receiving apertures are located in said inner faces of said frame members, assembling a plurality of metal security bars with said hollow frame members so that the ends of said security bars project through said security bar receiving apertures and into said hollow frame members and so that said security bars pass over and reside in contact with said attachment flanges, and spot welding said security bars to said attachment flanges so as to permanently secure said security bars to said metal door frame.

13. A method according to claim 12 further comprising roll forming said metal door frame from a single elongated strip of sheet metal and cutting miter cuts into said strip to form mitered corners between adjacent frame members.

14. A method according to claim 12 further comprising the steps of:

cutting an elongated continuous flat sheet metal strip to form mutually parallel, longitudinal edges thereon;

cutting mitered corners and pairs of opposing corner tabs in said longitudinal edges of said strip;

rolling said flat sheet metal strip to form a structure having a hollow cross section;

crimping said longitudinal edges of said strip together between said mitered corners to form said stile frame members and said transverse rail frame members;

longitudinally bending said rolled sheet metal strip at right angles between said frame members to bring said stile frame members into perpendicular alignment relative to said rail frame members and so that said pairs of corner tabs project alongside surfaces of said frame members adjacent thereto at said mitered corners; and spot welding said pairs of corner tabs to said frame members adjacent thereto to thereby secure said stile frame members in perpendicular alignment relative to said upper and lower transverse rail frame members.

15. A method according to claim 14 further comprising cutting spot welding electrode access openings into said sheet metal strip, inserting internal spot welding electrodes into said electrode access openings prior to spot welding said pairs of corner tabs, and withdrawing said internal electrodes from said electrode access openings after spot welding said pairs of corner tabs.

16. A method according to claim 15 further comprising sequentially spot welding each of said corner tabs in each of said pairs.

* * * * *